Dec. 11, 1923.
H. A. CARTWRIGHT
DIFFERENTIAL MECHANISM
Filed Dec. 5, 1922
1,477,311
2 Sheets-Sheet 2
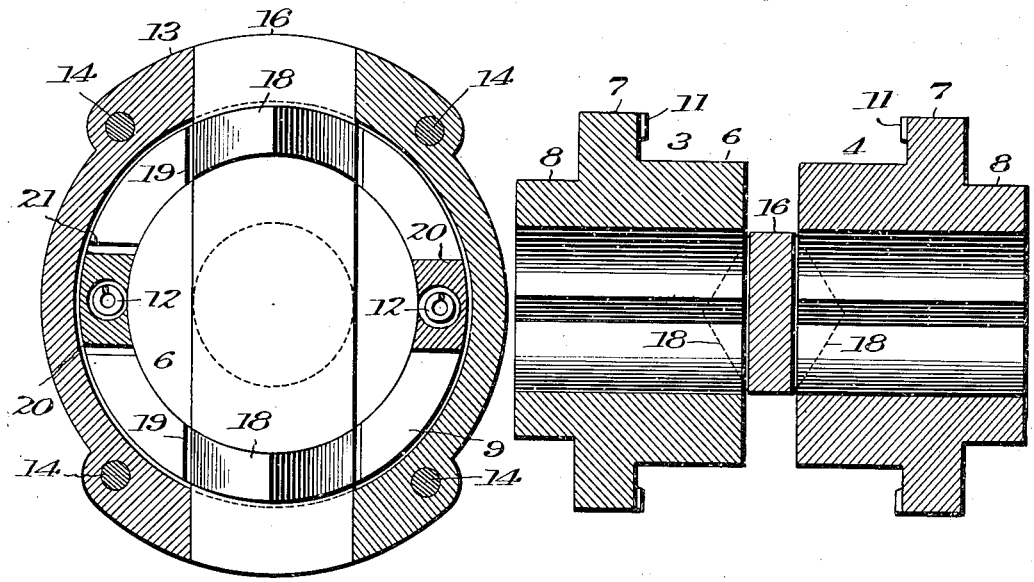
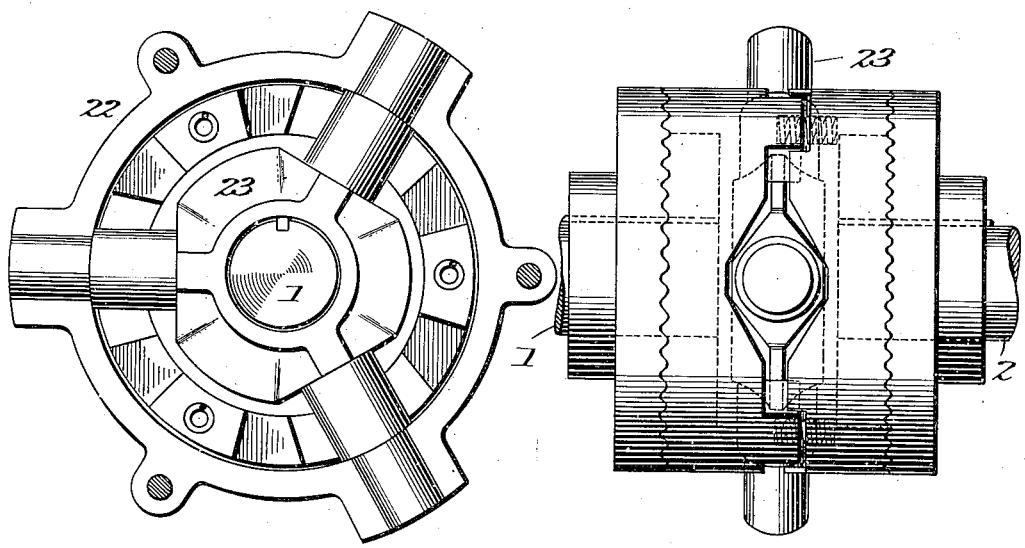
Inventor
Horace A. Cartwright
By
Attorney Patented Dec. 11, 1923.

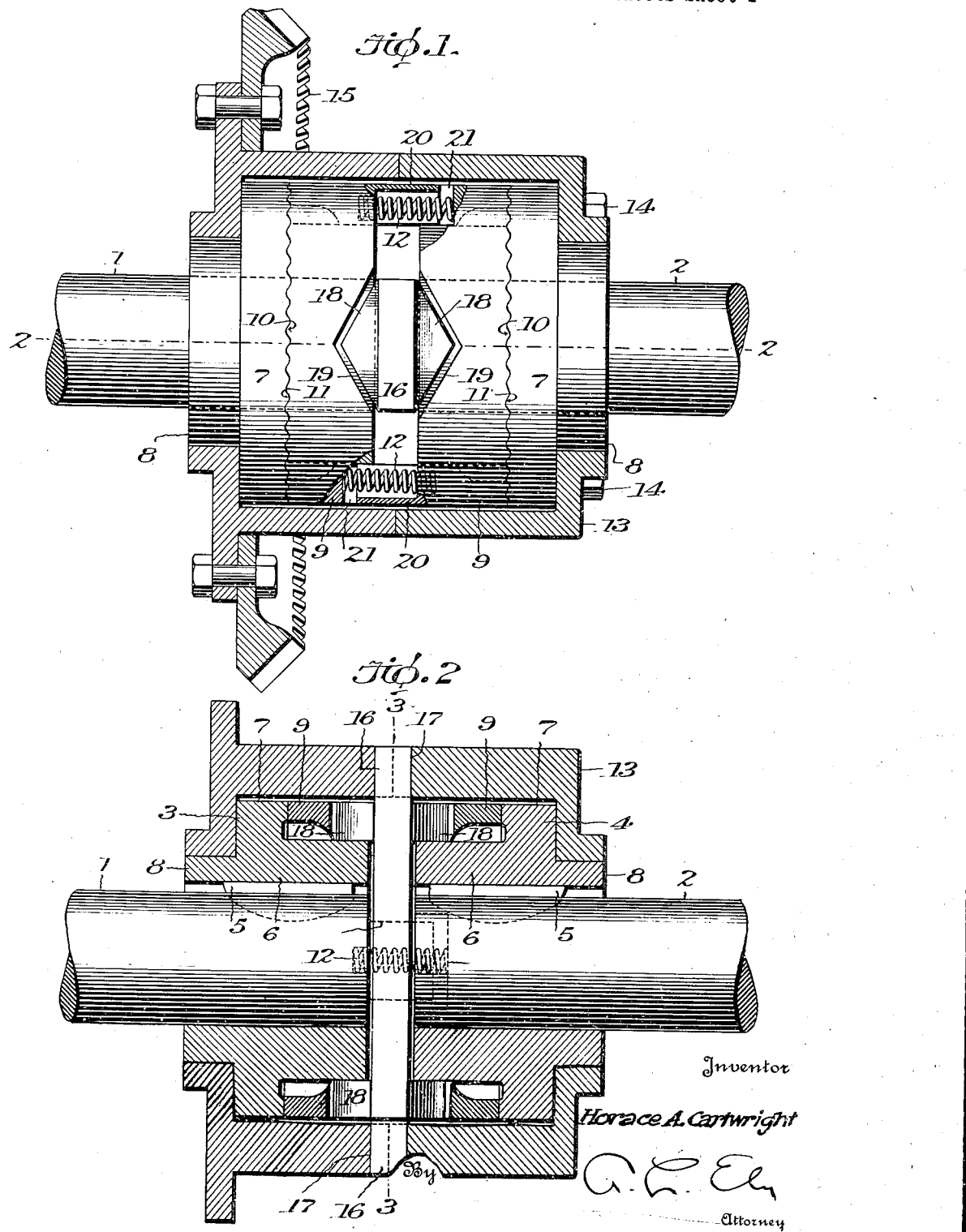

1,477,311

UNITED STATES PATENT OFFICE.

HORACE A. CARTWRIGHT, AKRON, OHIO.

DIFFERENTIAL MECHANISM.

Application filed December 5, 1922. Serial No. 605,008.

*To all whom it may concern:*

Be it known that I, HORACE A. CARTWRIGHT, a citizen of the United States, residing at Akron, in the county of Summit, State of Ohio, have invented certain new and useful Improvements in Differential Mechanism, of which the following is a specification.

My invention relates to improvements in differential mechanism for driving motor vehicles or the like, although it may be used in other capacities if desired, as will presently appear.

The purpose of this invention is to provide a simplified mechanism for driving a two part rear axle which will permit differential movements of the parts of the axle replacing the gearing such as is commonly used in differential mechanisms.

Specifically my invention is directed toward improving the structure and operation of the form of mechanism shown by me in my copending application Serial Number 362,479, filed March 1, 1920.

Other objects, together with the particular advantages of my present invention will appear when the following description is read and upon reference to the accompanying drawings.

In the drawings:

Figure 1 is a longitudinal sectional view, partly in elevation, showing my improved differential mechanism;

Figure 2 is a horizontal sectional view taken on the line 2—2 of Figure 1;

Figure 3 is a transverse sectional view taken on the line 3—3 of Figure 2;

Figure 4 is a longitudinal sectional view illustrating the relative position of a pair of shiftable clutch elements and a driving member, all forming a part of my invention;

Figure 5 is an elevational view looking at the inner end of one member of a two part axle and showing a modification of my invention; and Figure 6 is an elevational view looking toward the left side of Figure 5.

In the drawings I have illustrated, at 1 and 2, respectively, the two parts of an axle, such as the rear axle of an automobile, spaced from each other, for a purpose presently apparent. In accordance with my present invention I provide, upon the axle, a pair of oppositely disposed clutch elements, 3 and 4, respectively, which are fixed in spaced apart relation upon the inner ends of the parts 1 and 2 by suitable keys 5. Each fixed clutch element comprises an inwardly extending sleeve portion 6, an intermediate external flanged portion 7, and an outwardly extending sleeve portion 8. The sleeve portions 6 of the elements 3 and 4 carry shiftable clutch collars 9 that are rotatable upon their associated sleeves and slidable longitudinally thereof. The collars 9 are spaced from each other and are provided with undulating outer side edges 10 which engage correspondingly formed surfaces 11 upon the inner faces of the flanges 7. Expansion springs 12 normally hold the collars 9 apart and in driving engagement with the flanges 7. The primary driving element of my differential mechanism comprises a casing 13 which is constructed to rotate upon the sleeve portions 8 of the elements 3 and 4. The casing 13 is formed in two cylindrical portions which are bolted together with their inner edges abutting, as shown at 14. A drive pinion 15 is fixed upon one part of the casing 13 to be driven in any suitable manner by the engine, or motor, of the vehicle.

The casing, or driving elements 13, carries an elongated driving key 16 which extends diametrically of the casing and the axle between the aforesaid clutch elements 3, 4, and 9 and also between the ends of the axle parts 1 and 2. Each end of the key 16 is socketed, as at 17, between the abutting edges of the casing 13. Adjacent each end the key 16 is provided upon its sides with a pair of laterally projecting oppositely disposed lugs 18 for engaging the collars 9. The lugs 18 are formed with the same radius as that of the collars 9 and are provided respectively with wedge shaped outer edges. Oppositely disposed notches 19 that correspond to the shape of the lugs 18 are formed in the outer faces of the collars 9 to receive and seat the lugs 18. The notches 19 are larger than the lugs 18 so that the collars 9 may move toward each other out of engagement with the flanges 7.

When the driving element, the casing 13, is rotated the key 16 carries with it the collars 9 and the clutch elements 3 and 4 as will be obvious. Differential movement of the parts 1 and 2 of the axle causes the collar 9 of the faster moving part to disengage from its associated flange 7 against the action of the springs 12. The shape of the lugs 18 and the notches 19 is such that the driving thrust of the driving element 13 tends to separate the collars 9 and hold them in engagement with the driven clutch elements 3 and 4 either in forward or reverse driving. At the same time collars 9 are free to disengage from either of the driven clutch elements 3 and 4 should turning movement of the vehicle cause one part of the axle to move faster than the other. The collars 9 are locked together both by the key 19 and also by sliding keys 20, one of which projects from each collar into a groove 21 formed in the opposite collar. Only a slight relative rotational movement of the sleeves is permitted sufficient to allow one of them to disengage from its flange 7. An additional advantage of this form of differential is that if one wheel loses traction, it, nevertheless, cannot turn without rotating the other. This latter feature of my invention prevents the spinning of one wheel as in the common forms of differentials and is a marked advantage of the improved form of differential.

In Figures 5 and 6 I have shown my invention applied to a standard form of driving element 22 such as that used in one type of differential. In this embodiment of my invention I substitute, for the key 16, a driving spider 23 having radial arms 24 which engage notches 25 in the edges of the collars 9. The extremities of the arms 24 are adapted to be received between the abutting edges of this form of casing as it is believed will be understood without further explanation.

A differential mechanism of this character has been found highly advantageous and efficient in operation. It is easy to manufacture and constitutes a distinct improvement over other forms of differentials commonly used.

The arrangement of parts and the structural details described in the foregoing may be modified to a material extent, however, without departing from the spirit of my invention or the scope of the appended claims.

What I claim is:

1. A differential mechanism comprising, a two part axle having spaced apart inner ends, oppositely disposed clutch elements fixed respectively upon the inner ends of the axle, a shiftable clutch element rotatively mounted upon each fixed element, said shiftable elements having angular notches in their edges, and driving means for the shiftable elements embodying an elongated key disposed diametrically of the axle ends to rotate therebetween, said key being provided with lateral projections for engaging the notches in the shiftable elements.

2. A differential mechanism comprising, a two part axle having spaced apart inner ends, oppositely disposed clutch elements fixed respectively upon the inner ends of the axle in spaced apart relation, oppositely disposed shiftable clutch elements carried by the fixed elements in spaced apart relation, the edges of the shiftable elements having angular notches therein, and driving means for the shiftable elements including an elongated key arranged diametrically of the axle to rotate between said ends thereof and between the shiftable clutch elements, said key embodying laterally projecting angular lugs at each end thereof adapted to engage the notches in said shiftable elements.

3. A differential mechanism comprising, a two part axle having spaced apart inner ends, oppositely disposed clutch elements fixed respectively upon said axle ends in spaced apart relation, oppositely disposed shiftable clutch elements carried upon the fixed elements, said shiftable elements being keyed together against free relative rotation and having notched edges, and driving means for the shiftable elements including a elongated key arranged diametrically of the axle to rotate between said ends thereof and also between said shiftable elements, said key being provided adjacent each of its ends with laterally projecting lugs arranged to seat in the notches of the shiftable elements, the lugs being smaller than the notches in the shiftable elements.

4. A differential mechanism comprising a two part axle having spaced apart inner ends, oppositely disposed clutch elements fixed respectively upon said axle ends in spaced apart relation, oppositely disposed shiftable clutch elements having similar tory mating formations engaging similar formations on the fixed clutch elements, said shiftable elements being keyed together against free relative rotation and having notched edges and driving means for the shiftable elements including an elongated key arranged diametrically of the axle to rotate between the ends thereof and also between said shiftable elements, said key being provided adjacent each of its ends with laterally projecting lugs arranged to seat in the notches of the shiftable elements the lugs being smaller than the notches in the shiftable elements.

HORACE A. CARTWRIGHT.